United States Patent [19]

Hutter

[11] Patent Number: 5,085,699
[45] Date of Patent: Feb. 4, 1992

[54] AMNIOPOLYESTER RESINS AS DILUTION EXTENDERS FOR ZINC-CONTAINING METAL RESINATE INKS

[75] Inventor: G. Frederick Hutter, Charleston, S.C.

[73] Assignee: Westvaco Corporation, New York, N.Y.

[21] Appl. No.: 682,121

[22] Filed: Apr. 8, 1991

[51] Int. Cl.$^5$ .............................................. C09D 11/08
[52] U.S. Cl. ...................................... 106/30; 524/272; 525/437
[58] Field of Search ............... 528/272, 281, 291, 350, 528/353; 106/30; 525/437; 524/272

[56] References Cited

U.S. PATENT DOCUMENTS

| | | | |
|---|---|---|---|
| 2,610,180 | 9/1952 | Klug | 260/231 |
| 3,468,829 | 9/1969 | Yoshioka et al. | 260/27 |
| 4,265,966 | 5/1981 | Schuh | 428/324 |
| 4,528,036 | 7/1985 | Rudolphy | 106/30 |
| 4,552,592 | 11/1985 | Rudolphy et al. | 106/30 |
| 4,767,835 | 8/1988 | Janusz | 527/600 |
| 4,990,187 | 2/1991 | Dien et al. | 106/30 |
| 5,000,792 | 3/1991 | Ohta et al. | 106/499 |

OTHER PUBLICATIONS

Hutter, U.S. patent application Serial #07/571,990, for "Aminoacrylate Resins as Thickeners for Zinc-Containing Metal Resinate Inks", (08/24/90).

*Primary Examiner*—William R. Dixon, Jr.
*Assistant Examiner*—Margaret V. Einsmann
*Attorney, Agent, or Firm*—Daniel B. Reese, IV; Terry B. McDaniel; R. L. Schmalz

[57] ABSTRACT

The invention is novel aminopolyester resins and the process for preparing them. In particular, the invention relates to aminopolyester resins having properties which make them useful as resinate dilution extenders in formulating vehicles for gravure and intaglio printing inks.

8 Claims, No Drawings

AMNIOPOLYESTER RESINS AS DILUTION EXTENDERS FOR ZINC-CONTAINING METAL RESINATE INKS

FIELD OF INVENTION

The invention relates to novel aminopolyester resins and the process for preparing them. In particular, the invention relates to aminopolyester resins having properties which make them useful as resinate dilution extenders in formulating vehicles for gravure and intaglio printing inks.

BACKGROUND OF THE INVENTION

The high acid values common in rosins utilized to make ink resins can be lowered by reacting the rosins with zinc oxide, calcium acetate, or similar compounds to produce metallic resinates. Metal resinates are widely used as binders in gravure printing inks due to their rapid solvent release and their ability to prevent some basic pigments from livering. These resinates are soluble in hydrocarbons, but not in alcohol.

One of the shortcomings of using metal resinates in gravure inks has been their low solution viscosities, a byproduct of their low molecular weights. These low viscosities make it difficult to formulate inks having the desired pigment-to-binder ratios at press viscosities that are necessary for this type of printing.

Another critical property of metal resinate solutions that is directly linked to viscosity is dilutability. Viscosity is measured by the time required for an exact quantity of solution to flow by gravity through a specially sized apparatus. Dilutability is measured by the amount of solvent needed to reduce the viscosity of a given weight of resinate solution to a certain level. The typical specification for a metal resinate solution calls for the volume of toluene needed to reduce 100 grams of resinate to an 18 second flow as measured with a #2 Shell cup.

The usual dilutability values of commercial resinates are between 70 to 120 ml. Ink makers would like dilutability values higher than this in order to achieve a desirable balance of solids, color strength, and viscosity in finished inks.

To solve these problems of viscosity and dilutability with metal resinate formulations, ink makers traditionally have added small amounts of ethylcellulose or ethylhydroxyethyl-cellulose (EHEC) to the ink as a thickener (the properties of which are discussed in U.S. Pat. No. 2,610,180). EHEC owes its thickening ability to three factors: (a) a very high molecular weight, (b) a rigid molecular structure, and (c) intermolecular association via hydrogen bonding of unetherified hydroxyl groups on the cellulose backbone. These factors permit EHEC to be used to produce a drastic reduction in resin solids at press viscosity (expressed in the industry as a "high dilution").

However, using EHEC as a thickener gives rise to other problems, as described in Leach, R.H., *The Printing Ink Manual*, Van Nostrand Reinhold Co. Ltd., London, 1988. Very small amounts of EHEC can cause substantial reductions in the gloss of an ink. Also, the cost of EHEC is relatively expensive. Finally, EHEC is only marginally compatible with metal resinates. This incompatability seems to vary from batch to batch, and may manifest itself in phase separation of the ink upon standing.

Attempts have been made to eliminate those problems with EHEC by producing other ink thickeners. It is known to prepare printing ink binders based on reaction products of (a) natural resins, (b) other synthetic resins (for example hydrocarbon resins having a bromine number of 5 to 80), and (c) calcium compounds (and, if appropriate, other compounds of group II of the periodic system). In this process an unsaturated dicarboxylic acid (i.e., maleic anhydride) is reacted at the same time. This method, taught in U.S. Pat. No. 3,468,829, has a disadvantage in that the resulting viscous products are virtually not utilizable as printing ink binders.

Other known binders are taught in U.S. Pat. No. 4,528,036 and U.S. Pat. No. 4,552,592. Here, the binders are based on the reaction products of (a) natural resins, (b) a copolymer or a synthetic resin and (c) calcium compounds. The resulting reaction products are reacted subsequently with acetic acid to form a salt of the corresponding resin. These solutions are of relatively low molecular weights and viscosities.

Yet another known binder is the product complex formed by reaction of a metal resinate and an amine-reactive polyamide as taught in U.S. Pat. No. 4,767,835. The amine-reactive polyamide, being a condensation polymer, is of comparatively low molecular weight.

An example of a dilution enhancer which utilizes a nitrogen-zinc complex mechanism similar to the one operative in the present application is taught in the commonly assigned U. S. Pat. No. 07/571,990 filed by G. Frederick Hutter on Aug. 24, 1990. This previously filed application teaches that resinate dilutability can be substantially enhanced by the use of small amounts of acrylic polymers containing pendant amine groups. These amine groups form coordinate complexes with the zinc ions present in the resinate. These formed complexes create a higher apparent molecular weight which provides higher viscosities to the resinate, thereby allowing desired dilution of the inks with solvent prior to printing. When evaluated against EHEC, the disclosed aminoacrylate resins were comparable in thickening ability and did not produce the gloss reduction problems associated with the use of EHEC. However, these resins have proven to be more difficult to blend with resinates than EHEC due to gel formation that can be reduced only by vigorous agitation.

Despite the development of these, and other, thickeners EHEC remains the preferred viscosity enhancer in the field. Therefore, it is an object of this invention to produce an economical thickener of a high molecular weight and high dilutability, which exhibits an enhanced compatibility with the metal resinates commonly utilized in gravure printing inks.

SUMMARY OF THE INVENTION

This object is achieved by reaction of the metal ions present in the resinate solution to form a complex with a high molecular weight polyester containing multiple amine groups. That is, nitrogen present in the aminopolyester resin complexes with the metal ions (particularly the zinc ions) present in the resinate solution to form the dilution extender.

Furthermore, a very wide variety of amine-containing polyesters suitable for use in this process can be synthesized from commercially available raw materials. For example, an aminodiol, such as methyldiethanolamine, can be reacted with a variety of diacids from succinic ($C_4$) to dimer ($C_{36}$) to produce linear aminopolyesters with a range of molecular weights and nitrogen contents.

Suitable branched aminopolyesters, or aminoalkyds, can be produced by incorporating amino triols, such as triethanolamine, or triacids, such as TE-95 (manufactured by Westvaco). It is known to control the molecular weights of aminoalkyds by addition of monoacids, such as L-5 acid (a tall oil fatty acid derivative manufactured by Westvaco) or monoalcohols, such as dimethylethanolamine. This ability to specifically tailor resinate dilution extenders to meet exact needs will greatly aid ink formulators in producing vehicles for intaglio and gravure printing inks.

DESCRIPTION OF THE PREFERRED EMBODIMENT

The invention that is useful as a thickener in publication gravure inks is prepared by reacting a metal resinate with an aminopolyester resin in solution.

Suitable metal resinates must include zinc, and may include other compounds of group II of the periodic system, either alone or in combination with rosin, phenolated rosin, polymerized rosin, maleated rosin, fumarated rosin, and the like, and their mixtures. The rosin may be derived from tall oil rosin, wood rosin, or gum rosin.

Solvents suitable for use in the reaction include aliphatic and aromatic hydrocarbons.

Polyesters suitable for use in the reaction may be linear or branched, although linear polyesters are preferred. The acid component of the polyester consists of carboxylic acid containing from 2 to 4 carboxyl groups (or their anhydride equivalents) and from 4 to 54 carbon atoms, or a mixture of such acids and anhydrides. The alcohol component of the polyester consists of a compound containing at least one tertiary amine group and from 2 to 5 hydroxyl groups, or a mixture of such aminoalcohols. The ratio of the acid and alcohol reactants must be such that the equivalent weight of the polymer per amine group is in the range of 200 to 600, and the polymer is soluble in aliphatic or aromatic hydrocarbons.

Additionally, such polyesters may optionally also contain: (a) a monofunctional aliphatic, cycloaliphatic, or aromatic alcohol or carboxylic acid; (b) an aminoalcohol containing one tertiary amine group and one hydroxyl group; (c) a diol or etherdiol of molecular weight from 62 to 600; and (d) any combination of (a), (b), or (c) where the ratio of the reactants being chosen is such that the equivalent weight of the polymer per amine group is in the range of 200 to 600, and the polymer is soluble in aliphatic or aromatic hydrocarbons. Those skilled in the art can use the above options to tailor the polyester to meet specific ink formulation needs.

The preferred form of polyester for use in the reaction is a linear reaction product of (a) an aliphatic, cycloaliphatic, or aromatic dicarboxylic acid containing from 4 to 36 carbon atoms (or a mixture of such acids); and (b) an aminodiol of the formula:

$$\text{HO}-\text{R}-\underset{\underset{\text{R''}}{|}}{\text{N}}-\text{R'}-\text{OH}$$

where R and R' are alkylene groups containing from 2 to 4 carbon atoms and R'' is an alkyl or aryl group containing from 1 to 18 carbon atoms, or a mixture of such diols, the ratios of the reactants being chosen such that the equivalent weight per amine group is in the range of 240–400 and the resin is soluble in aliphatic or aromatic hydrocarbons.

As appreciated in the art, the exact components and properties of components desired for any given ink application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

To a 500 ml flask equipped with a mechanical stirrer and nitrogen sparge is charged 158 g of Empol 1010 (a dimer acid manufactured by Henkel) and 42 g of methyldiethanolamine. The charge is heated to 200° C. and held at that temperature for 1.5 hours to yield a semi-solid polyester resin with an acid number of 5. This product is listed as Resin No. 1 in Table I below.

A dilution comparison was made between this aminopolyester resin and EHEC utilizing the resinate solution JONREZ ® MR-560. (JONREZ MR-560 is a toluene-soluble calcium/zinc resinate solution used for gravure inks, sold by Westvaco Corporation.) Dilutions were run by taking 100 g of the resinate or resinate/polyester blend and measuring the number of milliliters of toluene required to obtain a viscosity of 18 seconds with a #2 Shell cup. Here, the MR-560 control dilution was 100; and the percentages represent dry:dry ratios of polyester resin to resinate.

As stated earlier, the usual dilutability values of commercial resinates are between 70 and 120. At 0.9%, EHEC measured 130 to the invention polyester resin's 130. At 1.8%, EHEC measured 170 while the resin measured 150. At 3.6%, EHEC measured 245 to the resin's 200. Thus, the ability of the invention to enhance dilutability compared favorably with EHEC—especially when one takes into account that EHEC is more expensive than the polyester resin.

EXAMPLE 2

A series of linear polyester resins of differing compositions were produced via the method taught in Example 1. Subsequent dilution comparisons were made between the resulting resins and EHEC in the same manner outlined in Example 1.

TABLE I

Examples of Linear Aminopolyesters

| Resin No. | Composition[1] | Eq. Wgt.[2] Per Nitrogen | Dilution (%)[3] | | |
|---|---|---|---|---|---|
| | | | 0.9 | 1.8 | 3.6 |
| 1 | 79.0 E1010<br>21.0 MDEA | 538 | 130 | 150 | 200 |
| 2 | 52.5 AA<br>47.5 MDEA | 218 | Insol. in Toluene | | |
| 3 | 58.7 AzA<br>41.3 MDEA | 256 | Insol. in Toluene | | |
| 4 | 31.4 AzA<br>24.4 AA<br>44.2 MDEA | 237 | Incompat.<br>w/MR560 | | |
| 5 | 53.9 AA<br>24.4 MDEA<br>21.7 DEG | 423 | 130 | 150 | 230 |
| 6 | 70.3 1595<br>29.7 MDEA | 372 | 120 | 145 | 180 |
| 7 | 60.7 CM3<br>39.3 MDEA | 271 | 135 | 185 | 290 |

TABLE I-continued

Examples of Linear Aminopolyesters

| Resin No. | Composition[1] | Eq. Wgt.[2] Per Nitrogen | Dilution (%)[3] | | |
|---|---|---|---|---|---|
| | | | 0.9 | 1.8 | 3.6 |
| 8 | 29.1 AA<br>70.9 EC12 | 373 | 130 | 135 | 150 |
| 9 | 51.2 AzA<br>48.8 BDEA | 331 | 140 | 165 | 250 |
| 10 | 37.7 1595<br>23.0 AA<br>39.3 MDEA | 274 | 135 | 165 | 210 |
| 11 | 79.8 DTC<br>20.2 MDEA | 565 | 130 | 145 | 175 |
| 12 | 39.5 1595<br>19.4 SA<br>41.1 MDEA | 260 | 100 | 120 | 155 |
| 13 | 59.1 CM1<br>40.9 MDEA | 262 | 125 | 145 | 200 |
| 14 | 53.1 AA<br>37.0 MDEA<br>9.9 DEG | 280 | 120 | 145 | 220 |
| 15 | 54.1 THPA<br>36.2 MDEA<br>9.7 DEG | 287 | 110 | 130 | 170 |
| 16 | 48.2 AA<br>6.6 IPA<br>39.2 MDEA<br>6.0 PG | 263 | 135 | 175 | 265 |
| 17 | 52.6 AA<br>39.6 BDEA<br>7.8 DEG | 364 | 135 | 170 | 235 |
| 18 | 48.7 AA<br>6.6 IPA<br>39.7 MDEA<br>5.0 EG | 260 | 130 | 170 | 240 |
| 19 | 50.1 AA<br>42.5 PDEA<br>7.4 DEG | 384 | 105 | 110 | 125 |
| Control | — EHEC | — | 130 | 170 | 245 |

[1]Composition of linear aminopolyesters in parts per 100 by weight.
AA = adipic acid
AzA = azelaic acid
BDEA = butyldiethanolamine
CM1 = Corfree M1 (mixed $C_{11}$–$C_{12}$ diacids from DuPont)
CM3 = Corfree M3 (a $C_{12}$ diacid from DuPont)
DEG = diethylene glycol
DTC = DTC 195 (a mixture of $C_{36}$ dimer and $C_{54}$ trimer acids from Westvaco)
E1010 = Empol 1010 (a $C_{36}$ dimer acid from Henkel)
EC12 = Ethomeen C/12 (a bis-hydroxyethylcocoamine from Akzo)
EG = ethylene glycol
IPA = isophthalic acid
MDEA = methyldiethanolamine
PG = propylene glycol
PDEA = phenyldiethanolamine
SA = succinic anhydride
THPA = tetrahydrophthalic anhydride
1595 = Diacid 1595 (a high purity $C_{21}$ diacid from Westvaco)
[2]Equivalent weight per nitrogen.
[3]Amount of toluene (in milliliters) required to reduce the viscosity of 100 g of blend to 18 seconds as measured by a #2 shell cup. The three percentage columns reflect the dry weight percentages of active polyester on MR-560 resinate solids.

While the compositions shown in Table I by no means exhaust all of the possibilities of this chemistry, they are of a sufficient variety to draw correlations between structure and dilution enhancement.

For linear aminopolyesters, there seems to be a preferred nitrogen content of one equivalent of amine per 270 g of resin (see Resin No. 7). Lower amine content (e.g., Resins Nos. 1 and 6), yields a somewhat lower, although still acceptable, resinate dilutability. Higher amine content tends to produce insolubility in toluene (e.g., Resins Nos. 2 and 3) or precipitation of the polyester/resinate complex (see Resin No. 4. One notable exception to this seems to be Resin No. 12, which contains succinic acid. The combination of succinic acid with methyldrethanolamine probably gives a significant amount of cyclic ester byproduct, which would lower the average molecular weight of the polymer.

Therefore, as the results in Table I illustrate, a wide variety of linear polyesters which compare favorably with EHEC in both dilution enhancement and cost are capable of production.

EXAMPLE 3

A series of branched polyester resins of differing compositions were produced via the method taught in Example 1. Subsequent dilution comparisons were made between the resulting resins and EHEC in the same manner outlined in Example 1.

TABLE II

Examples of Branched Aminopolyesters

| Resin No. | Composition[1] | Eq. Wgt.[2] Per Nitrogen | Dilution (%)[3] | | |
|---|---|---|---|---|---|
| | | | 0.9 | 1.8 | 3.6 |
| 1 | 72.9 E1010<br>27.1 TEA | 523 | 140 | 145 | 170 |
| 2 | 54.0 L-5<br>19.2 AA<br>26.8 TEA | 510 | 110 | 115 | 120 |
| 3 | 20.2 L-5<br>32.8 AA<br>47.0 MDEA | 288 | 110 | 125 | 150 |
| 4 | 21.5 AA<br>79.5 EDAC13 | 229 | 100 | 105 | 120 |
| 5 | 62.8 1595<br>37.2 TEA | 375 | 100 | 110 | 125 |
| 6 | 35.8 AA<br>13.1 TBBA<br>51.1 TEA | 262 | 100 | 105 | 125 |
| 7 | 52.4 TE-95<br>38.1 MDEA<br>9.5 DMEA | 223 | 100 | 110 | 135 |
| 8 | 26.5 C3B<br>30.3 AA<br>43.2 TEA | 314 | 105 | 110 | 125 |
| Control | — EHEC | — | 130 | 170 | 245 |

[1]Composition of branched aminopolyesters in parts per 100 by weight.
AA = adipic acid
C3B = mixture of rosin and fatty acid from Westvaco
DMEA = dimethylethanolamine
E1010 = Empol 1010 (a $C_{36}$ dimer acid from Henkel)
EDAC13 = Ethoduomeen C/13 (a hydroxyethylated fatty diamine from Akzo)
L-5 = tall oil fatty acid from Westvaco
MDEA = methyldiethanolamine
TBBA = tert-butylbenzoic acid
TE-95 = tall oil fatty acid/maleic anhydride adduct from Westvaco)
TEA = triethanolamine
1595 = Diacid 1595 (a hight purity $C_{21}$ diacid from Westvaco)
[2]Equivalent weight per nitrogen.
[3]Amount of toluene (in milliliters) required to reduce the viscosity of 100 g of blend to 18 seconds as measured by a #2 shell cup. The three percentage columns reflect the dry weight percentages of active polyester on MR-560 resinate solids.

Again, the compositions shown in Table II are not meant to exhaust all the possibilities of this chemistry. The examples provide a basis upon which to draw correlations between structure and dilution enhancement.

Comparing the values in Table I and Table II, one can see that the linear polyesters generally give higher dilutions than do the branched ones. However, this is due to the branched aminopolyesters being made with relatively low molecular weights. The aminoalkyds were formulated to a Flory $P_a$ gel value of 1.05 to ensure that they would not gel even if cooled to a zero acid number. Higher molecular weight aminoalkyds can be made by lowering the $P_a$ gel value. These higher molecular weight branched polyesters would compare favorably with EHEC.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A zinc-containing metal resinate modified with a linear or branched polyester comprising the condensation reaction product of:
   (a) an aliphatic, cycloaliphatic, or aromatic carboxylic acid containing from 2 to 4 carboxyl groups or their anhydride equivalents, and from 4 to 54 carbon atoms, or a mixture of such acids and anhydrides; and
   (b) an aminoalcohol containing at least 1 tertiary amine group and from 2 to 5 hydroxyl groups, or a mixture of such aminoalcohols;
   (c) where the ratio of the reactants are such that the equivalent weight of the polymer per amine group is in the range of 200 to 600; and
   (d) the polyester is soluble in aliphatic or aromatic hydrocarbons.

2. The resinate of claim 1 wherein the zinc-containing metal resinate also includes calcium, magnesium, or a mixture thereof.

3. A printing ink comprising the metal resinate of claim 1 dissolved in a hydrocarbon solvent and pigment dispersed therein.

4. A printing ink comprising the metal resinate of claim 2 dissolved in a hydrocarbon solvent and pigment dispersed therein.

5. A zinc-containing metal resinate modified with a linear polyester comprising the condensation reaction product of:
   (a) an aliphatic, cycloaliphatic, or aromatic dicarboxylic acid containing from 4 to 36 carbon atoms, or a mixture of such acids; and
   (b) an aminodiol of the formula

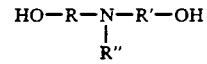

where R and R' are alkylene groups containing from 2 to 4 carbon atoms and R" is an alkyl or aryl group containing from 1 to 18 carbon atoms, or a mixture of such diols;
   (c) where the ratios of the reactants chosen are such that the equivalent weight of the polymer per amine group is in the range of 240–400; and
   (d) the polyester is soluble in aliphatic or aromatic hydrocarbons.

6. The resinate of claim 5 wherein the zinc-containing metal resinate also includes calcium, magnesium, or a mixture thereof.

7. A printing ink comprising the metal resinate of claim 5 dissolved in a hydrocarbon solvent and pigment dispersed therein.

8. A printing ink comprising the metal resinate of claim 6 dissolved in a hydrocarbon solvent and pigment dispersed therein.